United States Patent
Grace

(10) Patent No.: US 12,250,280 B2
(45) Date of Patent: Mar. 11, 2025

(54) SYSTEM AND METHOD FOR PROVIDING A MULTI-SIDED PLATFORM FOR BROADBAND AND CONTENT DELIVERY NETWORKS

(71) Applicant: Element8 Technology Investment Group Inc., Fort Worth, TX (US)

(72) Inventor: Kevin Michael Grace, Fort Worth, TX (US)

(73) Assignee: Element8 Technology Investment Group Inc., Fort Worth, TX (US)

( * ) Notice: Subject to any disclaimer, the term of this patent is extended or adjusted under 35 U.S.C. 154(b) by 0 days.

(21) Appl. No.: 17/408,932

(22) Filed: Aug. 23, 2021

(65) Prior Publication Data
US 2023/0057295 A1 Feb. 23, 2023

(51) Int. Cl.
| | | |
|---|---|---|
| *G06F 15/16* | (2006.01) | |
| *H04L 41/16* | (2022.01) | |
| *H04L 65/611* | (2022.01) | |
| *H04L 67/1012* | (2022.01) | |
| *H04L 67/306* | (2022.01) | |
| *H04L 67/561* | (2022.01) | |

(52) U.S. Cl.
CPC ............ *H04L 67/561* (2022.05); *H04L 41/16* (2013.01); *H04L 65/611* (2022.05); *H04L 67/1012* (2013.01); *H04L 67/306* (2013.01)

(58) Field of Classification Search
CPC . H04L 67/2804; H04L 41/16; H04L 65/4076; H04L 67/1012; H04L 67/306
USPC .......................................................... 709/203
See application file for complete search history.

(56) References Cited

U.S. PATENT DOCUMENTS

| | | | | |
|---|---|---|---|---|
| 9,154,535 | B1 * | 10/2015 | Harris | H04L 65/752 |
| 2003/0187853 | A1 * | 10/2003 | Hensley | G06Q 10/10 |
| 2004/0199635 | A1 * | 10/2004 | Ta | H04L 47/765 |
| | | | | 709/226 |
| 2004/0230469 | A1 * | 11/2004 | Christopherson | G06Q 30/02 |
| | | | | 705/7.29 |
| 2011/0179186 | A1 * | 7/2011 | Li | H04L 65/752 |
| | | | | 709/231 |
| 2011/0239273 | A1 * | 9/2011 | Yang | H04L 47/521 |
| | | | | 709/224 |
| 2012/0123870 | A1 * | 5/2012 | Denman | G06Q 30/0269 |
| | | | | 705/14.66 |
| 2012/0221706 | A1 * | 8/2012 | Westberg | H04L 47/822 |
| | | | | 709/223 |
| 2013/0144906 | A1 * | 6/2013 | Bhupalam | H04L 65/612 |
| | | | | 707/E17.014 |
| 2013/0179130 | A1 * | 7/2013 | Zhandov | G06F 30/00 |
| | | | | 703/2 |

(Continued)

*Primary Examiner* — Thuong Nguyen
(74) *Attorney, Agent, or Firm* — Schott, P.C.

(57) ABSTRACT

A web platform facilitates customization of decisions pertaining to content delivery management in a broadband network. A plurality of smart nodes may individually perform deep packet inspection (DPI) and to store DPI information thereof. Each smart node is installed at a neighborhood level in a broadband network. The web platform is used by at least one service provider and at least one content provider to provide respective preference data. A multi-attribute model generates at least one score corresponding to each of the preference data. The DPI information and the at least one score are analyzed for facilitating dynamic customization of the decisions and thereby delivering personalized content to an end-user.

18 Claims, 4 Drawing Sheets

(56) References Cited

U.S. PATENT DOCUMENTS

| | | | |
|---|---|---|---|
| 2013/0250761 A1* | 9/2013 | Shatzkamer | H04W 28/0226 370/235 |
| 2013/0339529 A1* | 12/2013 | Rizzo | H04L 67/1074 709/226 |
| 2014/0108630 A1* | 4/2014 | Barnes | G06F 9/50 709/223 |
| 2014/0214964 A1* | 7/2014 | Liyanage | H04L 51/52 709/205 |
| 2014/0247719 A1* | 9/2014 | Bugenhagen | H04L 47/808 370/232 |
| 2014/0307659 A1* | 10/2014 | Kweon | H04W 52/0254 370/329 |
| 2015/0310334 A1* | 10/2015 | Huang | H04L 43/08 706/46 |
| 2016/0142917 A1* | 5/2016 | Calo | H04W 4/029 705/7.33 |
| 2016/0142963 A1* | 5/2016 | Salkintzis | H04L 45/308 370/329 |
| 2016/0267545 A1* | 9/2016 | Glass | H04L 67/02 |
| 2017/0104775 A1* | 4/2017 | Vasseur | H04L 63/1425 |
| 2018/0255368 A1* | 9/2018 | Kasi | H04N 21/488 |
| 2018/0337871 A1* | 11/2018 | Matta | H04L 67/306 |
| 2018/0367822 A1* | 12/2018 | Glazner | H04L 65/80 |
| 2019/0068473 A1* | 2/2019 | Vu | H04L 41/16 |
| 2020/0005362 A1* | 1/2020 | Heaston | G06F 16/29 |
| 2020/0162414 A1* | 5/2020 | Klucznik | H04L 51/046 |
| 2020/0229155 A1* | 7/2020 | Chien | H04W 72/044 |
| 2020/0234428 A1* | 7/2020 | George | G06N 3/082 |
| 2020/0311124 A1* | 10/2020 | Gupta | H04N 21/4524 |
| 2020/0356767 A1* | 11/2020 | Yang | G06F 18/214 |
| 2020/0412817 A1* | 12/2020 | Ranjan | G06N 20/00 |
| 2021/0235545 A1* | 7/2021 | Polehn | H04W 74/0833 |
| 2021/0344607 A1* | 11/2021 | Sreevalsan | H04L 41/16 |
| 2022/0078171 A1* | 3/2022 | Borak | H04L 63/0236 |
| 2022/0086680 A1* | 3/2022 | Kwok | H04W 28/0268 |
| 2022/0159039 A1* | 5/2022 | Vinayagam | H04W 12/122 |

\* cited by examiner

SYSTEM AND METHOD FOR PROVIDING A MULTI-SIDED PLATFORM FOR BROADBAND AND CONTENT DELIVERY NETWORKS

FIELD OF THE DISCLOSURE

The present invention relates to broadband and content delivery networks and more particularly to implementation of a multi-sided platform for broadband and content delivery networks for providing better Internet experience to end users.

BACKGROUND OF THE DISCLOSURE

Traditionally, Internet Service Providers (SPs) and Content Service Providers (CPs) provide their services in centralized broadband network systems typically configured to handle aggregated level of data from several thousand households. In the traditional broadband network systems, the service providers (SP) are the observers, that merely perform deep packet data inspection (DPI) for the large volume of data. However, such systems lack the visibility of customers or end-users at a smaller level, for example, 'fewer number of households at a neighborhood level'. This means that although the centralized system may be capable of handling large data at a larger community level, it is not capable of managing and serving its customers at smaller neighborhood levels due to lack of visibility. The service providers associated to the traditional ISP architectures provide their services from the datacenters (DC) to end-users in only one direction. Any optimization pursuant to customers' requests is carried only by the datacenters, as other than the datacenters, there are no intelligent nodes deployed anywhere in the network that can customize or make any change in the data traffic and provide fast and effective solution as required. The nodes present in the centralized network thus function as observers or monitors that may take in information for future planning, but cannot make any changes in the traffic route or push updates down into network from the datacenters.

Further, in a centralized network, it is challenging to monitor traffic and perform deep packet data inspection (DPI) at a granular level. Moreover, it may be challenging for the service providers and the content service providers to co-operatively analyze any issues in the network and take appropriate measures to carry out required improvements. For example, improvements may be required with respect to SPs connectivity, CPs content hosting, etcetera. Since there is no visibility at the granular level, it becomes impossible to conduct Deep Packet Inspection (DPI) at the edge on raw network traffic, and to make dynamic optimization decisions and improvements in real time. The content providers do not have the flexibility to optimize and serve their content effectively through the service providers' network. There is no access provided from service provider (SP) to the content providers (CP). Also, due to lack of optimization facility, a content provider may incur additional expenses in bandwidth or computing resources.

In view of the above, the present invention as disclosed herein, aims to provide a novel system and method for providing intelligent platform allowing both the Internet service providers and the content providers to make optimization decisions across the network.

SUMMARY OF THE DISCLOSURE

This disclosure describes a proactive and intelligent solution that is capable of providing a dynamic content delivery management in a wireless broadband network.

An object of the present disclosure is to deploy a multi-sided platform facilitating in optimization of decisions by the Internet service providers (SPs) and the content providers (CPs)across the broadband network.

Another object of the present disclosure is to provide visibility from both content providers and service providers to make optimized decisions in real-time.

Another object of the present disclosure is to provide a web platform having a user interface to enables content providers and service providers to cooperate without sharing data.

An object of the present disclosure is to facilitate in making dynamic and automated decisions to balance priorities or preferences of both the content providers and service providers.

An object of the present disclosure is to provide a web platform to allow the service providers and the content providers to predefine one or more decision making criteria.

An object of the present disclosure is to facilitate the service providers to provide more capacity, lower latency, and true personalization to the end-users.

Another object of the present disclosure is to reduce transmission costs.

According to an embodiment of the present disclosure, there is provided a method for facilitating customization of decisions pertaining to content delivery management in a broadband network. The method comprises deploying a plurality of smart nodes at each hub home of at least one neighborhood level in the broadband network, each of the plurality of smart nodes is configured to perform deep packet inspection (DPI) and to store DPI information thereof; configuring a web platform having a user interface for: receiving a plurality of first preference data from at least one service provider in the broadband network, receiving a plurality of second preference data from at least one content provider in the broadband network, aggregating the received plurality of first and second preference data into a multi-attribute model to generate at least one score corresponding to each of the plurality of first and second preference data, analyzing the DPI information and the at least one score for facilitating dynamic customization of the decisions and thereby delivering personalized content to an end-user.

According to an embodiment of the present disclosure, the DPI information include information pertaining to network traffic flow, data usage pattern of corresponding at least one neighborhood level, available network resources, storage capacity of a corresponding smart node, bandwidth, virus traffic level at an instant, end-user preferences.

According to an embodiment of the present disclosure, the multi-attribute model is configured based on a plurality of predefined attributes.

According to an embodiment of the present disclosure, the plurality of first and second preference data are received in response to one or more queries displayed to the at least one content provider and the at least one service provider, the one or more queries based on the plurality of multiple attributes.

According to an embodiment of the present disclosure, the method further comprising: analyzing the DPI information along with other network data to identify whether an issue is to be resolved at the at least one service provider's end or at the at least one content provider's end; raising an error alert to the identified at least one service provider end or the identified at least one content provider; and sending correct attribute data to the identified at least one service provider end or the identified at least one content provider to resolve the identified issue in the broadband network.

According to an embodiment of the present disclosure, each of the plurality of smart nodes comprises one or more components including: an artificial intelligence (AI) capable compute unit and a smart module for performing the deep packet inspection and one or more caching decisions; and a storage unit for storing the DPI information and one or more content provided by the at least one content provider.

According to an embodiment of the present disclosure, the one or more caching decisions include decisions pertaining to store a content or associated links personalized for the end-user.

According to an embodiment of the present disclosure, the one or more caching decisions is analyzed along with the DPI information by the multi-attribute model to make a final decision of storing a required content for a required duration at a required neighborhood level, thereby dynamically making available the personalized content at edge of the network for the end-user.

According to an embodiment of the present disclosure, the broadband network is a decentralized wireless broadband network providing multiple redundancy within the network via the plurality of smart nodes.

According to an embodiment of the present disclosure, further comprising configuring one or more databases associated with the web platform for storing various data related to the dynamic customization of the decisions in the broadband network.

According to an embodiment of the present disclosure, a system for facilitating customization of decisions pertaining to content delivery management in a broadband network is disclosed. The system comprises a plurality of smart nodes deployed at each hub home of at least one neighborhood level in the broadband network, each of the plurality of smart nodes is configured to perform deep packet inspection (DPI) and to store DPI information thereof; a web platform having a user interface configured to: receive a plurality of first preference data from at least one service provider in the broadband network, receive a plurality of second preference data from at least one content provider in the broadband network, aggregate the received plurality of first and second preference data into a multi-attribute model to generate at least one score corresponding to each of the plurality of first and second preference data, analyze the DPI information and the at least one score for facilitating dynamic customization of the decisions and thereby delivering personalized content to an end-user.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

Like reference numerals refer to like parts throughout the description of several views of the drawings.

DETAILED DESCRIPTION OF THE INVENTION

Figure 1:
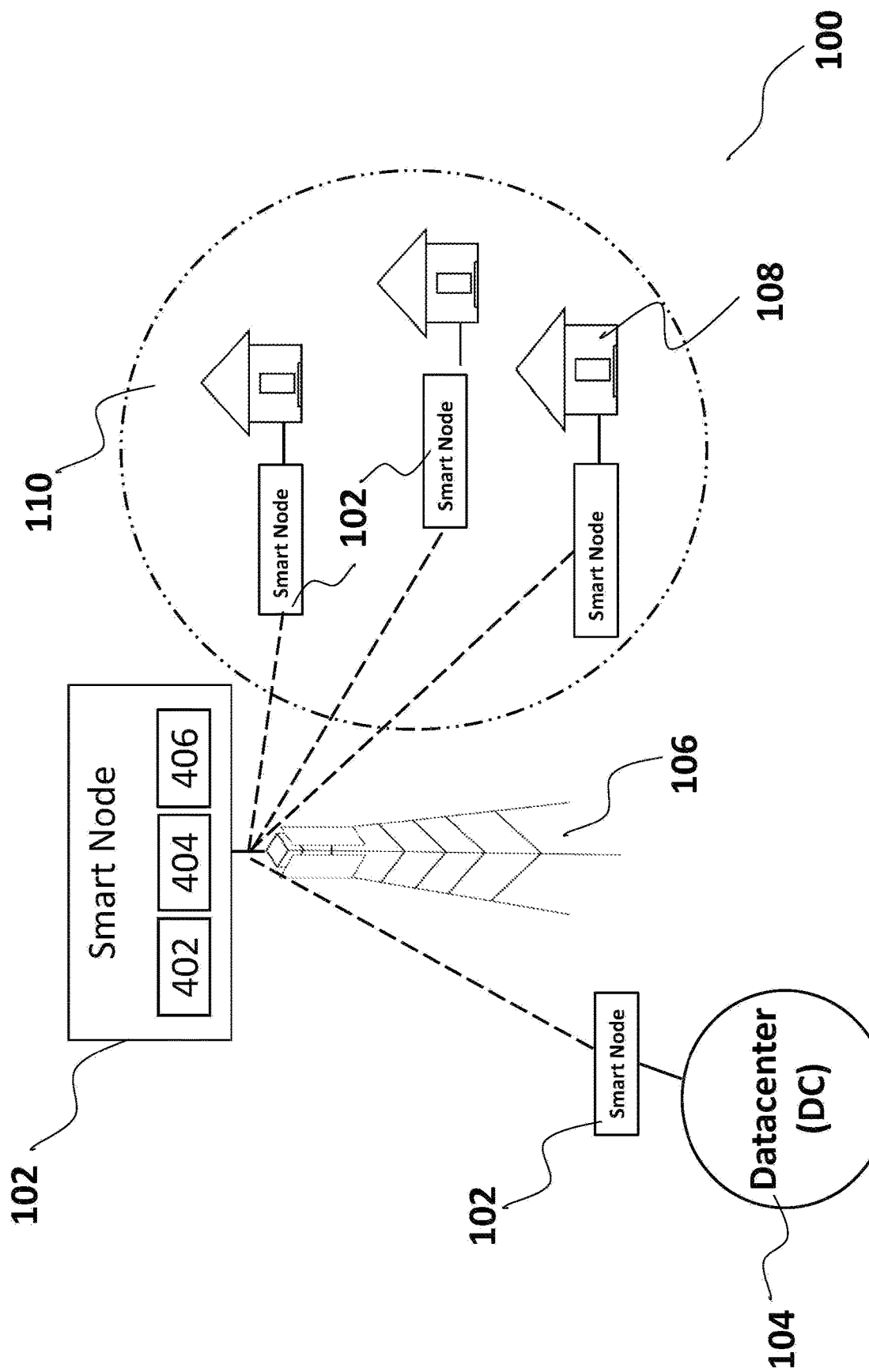
FIG. 1 illustrates architecture of a broadband network system, according to an exemplary embodiment of the invention.

This section is intended to provide explanation and description of various possible embodiments of the present invention. The embodiments used herein, and various features and details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present invention relates to customization of decisions pertaining to content delivery management at a granular level in a broadband network. A plurality of smart nodes is deployed at each hub home of at least one neighborhood level in the broadband network. Each of the plurality of smart nodes is configured to perform deep packet inspection (DPI) and to store DPI information thereof. A web platform having a user interface is configured for receiving a plurality of first preference data from at least one service provider in the broadband network. A plurality of second preference data is received from at least one content provider in the broadband network. The received plurality of first and second preference data are aggregated into a multi-attribute model to generate at least one score corresponding to each of the plurality of first and second preference data. Further, the DPI information and the at least one score for facilitating dynamic customization of the decisions and thereby delivering a personalized content to an end-user.

As used herein, 'hub-home' may include a commercial or residential building located in an area where a customer premise equipment (CPE) may be installed for providing network connections.

As used herein, datacentre' may include a dedicated space to accommodate a plurality of computer systems, storage devices, servers, routers, network switches and other associated devices or components that are necessary in the processes of a typical telecommunication network, such as transportation of network data traffic from a server to the consumer premise equipment.

As used herein, 'user device' may include a smart electronic device capable of communicating with various other electronic devices and applications via one or more communication networks. Examples of said user device include, but not limited to, a wireless communication device, a smart phone, a tablet, a desktop, etcetera. The user device comprises: an input unit to receive one or more input data; an operating system to enable the user device to operate; a processor to process various data and information; a memory unit to store initial data, intermediary data and final data; and an output unit.

As used herein, 'module' or 'unit' may refer to a device, a system, a hardware, a computer application configured to execute specific functions or instructions according to the embodiments of the present invention. The module or unit may include a single device or multiple devices configured to perform specific functions according to the present invention disclosed herein.

Terms such as 'connect', 'integrate', 'configure', and other similar terms may include a physical connection, a wireless connection, a logical connection or a combination of such connections including electrical, optical, RF, infrared, or other transmission media, and include configuration of software applications to execute computer program instructions, as specific to the presently disclosed embodiments, or as may be obvious to a person skilled in the art.

Terms such as 'send', 'transfer', 'transmit' and 'receive', 'collect', 'obtain', 'access' and other similar terms may refer to transmission of data between various modules and units via wired or wireless connections across a communication network.

FIG. 1 illustrates architecture of a broadband network system 100, according to an exemplary embodiment of the invention. The system 100 comprises a plurality of smart nodes 102, at least one datacenter 104, and at least one network tower 106. Each of the plurality of smart nodes 102 is an intelligent network node and has the capability to make decision of its own, wherein the decision may be different to other nodes' decisions. Each of the plurality of smart nodes 102 is deployed as a micro point of presence (micro POP) at the at least one tower 106, and at the at least one datacenter 104. The micro POP is a 'point of presence' (POP) and serves as an access point at a physical location for connecting two or more network devices. The smart nodes 102 are also deployed at each of a plurality of hub-homes 108. The plurality of hub-homes 108 within an area or locality makes a neighborhood. Each of the plurality of hub-homes 108 therefore belongs to at least one neighborhood 110. One or more neighborhood 110 consisting of hub-homes 108 may belong to a community of end-users. Fixing or installing the smart nodes 102 at each hub-home 108, the network tower 106 and the datacenter 104 provides the end-user the experience of customization based on their localized needs. The broadband network 100 system therefore facilitates in providing micro edge deployment of the smart nodes 102 at the hub-homes 108 for the end-users. This further facilitates in customization of decisions pertaining to content delivery management in a broadband network 100 for thereby delivering a personalized content to an end-user.

One or more authorized service providers and one or more authorized content providers may use respective smart electronic communication devices to facilitate in customization of decisions pertaining to content delivery management in a broadband network 100. Such devices are capable of executing standard communication protocols (for example, Simple Object Access Protocol or SOAP) that allow processes using different operating systems, such as 'Linux', 'Windows' to communicate via HTTP and its XML. The end-users may use smart user devices to access various available contents being delivered by the one or more content providers 204. The smart electronic communication devices and smart user devices may include high speed computers, smart phones, tablets, laptops, television sets.

Each of the plurality of smart nodes 102 may be configured to integrate one or more components including an artificial intelligence (AI) capable compute unit 402 and a smart module 404. The AI capable compute unit 402 and smart module 404 are configured to provide customization of the plurality of smart nodes 102 based on usage pattern of corresponding at least one neighborhood 110. For example, if in a neighborhood or locality, any particular genre of movies or TV shows is popular amongst the users/viewers, then the smart nodes 102 installed at that particular neighborhood is capable to identify the same and accordingly will customize the data traffic flow to provide popular content on edge for the end-users. The AI capable compute unit 402 and the smart module 404 of the smart nodes 102 decentralizes edge network distribution and facilitate in providing preferred content from the at least one datacenter 104 to the end-users of the corresponding at least one neighborhood 110.

The smart nodes 102 may be installed at the outside of the hub-home 108 to provide network connectivity within an optimum range. The at least one neighborhood 110 may include <50 hub-homes 108. The neighborhood 110 may therefore be a small area with small number of hub-homes 108 sending and receiving small data packets that is relatively easy to manage. One or more neighborhood 110 may combine as a community of hub-homes 108 or end-users. In one embodiment herein, a community may include <100 hub-homes 108. The smart nodes 102 is capable to perform deep packet inspection (DPI) at a neighborhood 110 level for less than 50 homes, for example. The DPI inspection process of the data may include detail inspection of data being sent over the neighborhood 110 level. Subsequently, actions may be taken such as alerting, notifying, blocking, changing the route of the traffic etcetera.

The smart nodes 102 as configured in the broadband network 100, may function as an observer as well as a decision maker. This makes the broadband network 100 system as an intelligent network having proactive/reactive capabilities. The proactive capabilities of the broadband network 100 include making updates in real-time, identifying and preventing virus traffic, identifying theft, providing high-speed CDN services. Further, over-the-air (OTA) updates is possible in the network by installing the smart nodes 102 in the network. The pro-active capabilities of the smart nodes 102 as deployed in the broadband network 100 facilitates in saving a large amount of bandwidth. It also facilitates in high-speed data flow and high-speed content delivery.

Figure 2:
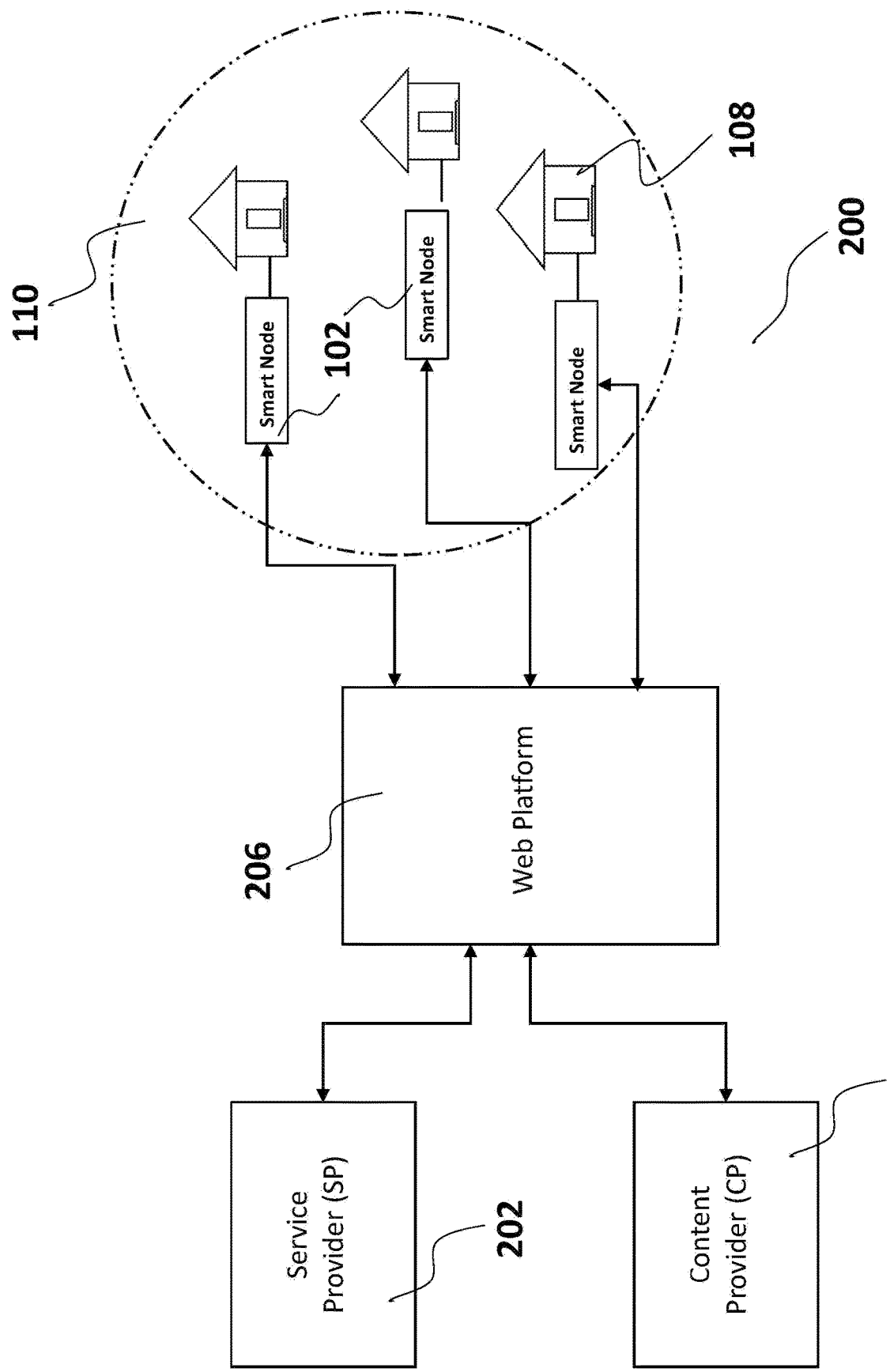
FIG. 2 illustrates a system for facilitating customization of decisions pertaining to content delivery management in the broadband network, according to an exemplary embodiment of the present invention.

FIG. 2 illustrates the system 200 for facilitating customization of decisions pertaining to content delivery management in the broadband network 100. The system 200 comprises the plurality of smart nodes 102 deployed at a neighborhood level 110 in the broadband network 100. The broadband network 100 is a decentralized wireless broadband network 100 providing multiple redundancy within the network via the plurality of smart nodes 102.

Figure 3:
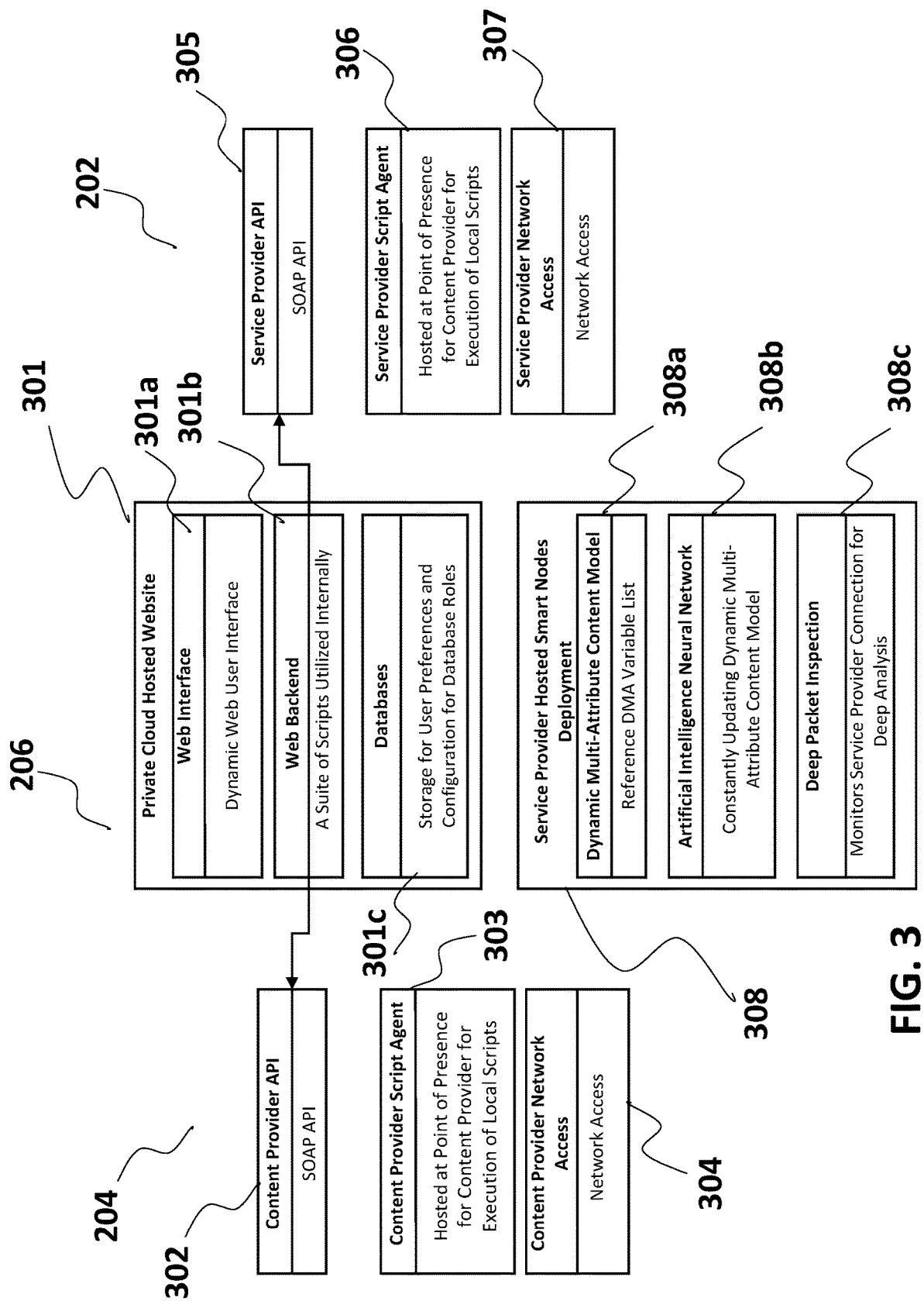
FIG. 3 various modules of a web platform configured to provide customization of decisions pertaining to content delivery management in the broadband network, according to an exemplary embodiment of the present invention.

Each of the plurality of smart nodes 102 is installed at each of a hub home 108, a network tower 106 and the datacenter 104 as described above. Each of the plurality of smart nodes 102 is configured to perform deep packet inspection (DPI) and to store DPI information thereof. Also, as seen in FIG. 1, each of the plurality of smart nodes 102 comprises one or more components including: the AI capable compute unit 402 and the smart module 404 for performing the deep packet inspection and one or more caching decisions. The smart node 102 also contains a storage unit 406 for storing the DPI information and one or more content provided by the at least one content provider 202. The AI capable compute unit 402 and the smart module 404, and the storage unit 406 is shown in FIG. 1 to be incorporated with one smart node 102, however, without departing from the scope of the present disclosure it may be incorporated with all smart nodes 102. The DPI information and the at least one score for facilitating dynamic customization of the decisions and thereby delivering a personalized content to an end-user. A web platform 206 having a user interface is configured for receiving a plurality of first preference data from at least one service provider 202 in the broadband network 100. Various modules of the web platform 206 such as API, AI processing module, Web Portal, are illustrated in FIG. 3, and is described below in detailed.

Referring now to FIG. 2, the web platform 206 further receives a plurality of second preference data received from at least one content provider 204 in the broadband network 100. The at least one service provider 202 and the at least one content provider 204 are authorized to access the web platform 206. The first and second preference data helps the web platform 206 to determine what are the priorities or preference of each party, i.e., the at least one service provider 202 and the at least one content provider. For example, service providers 202 may prioritize network efficiency based on its available resource capacity and utilization. On the other hand, service providers 202 and the content providers 204, such as 'Netflix' may want the top ten streaming movies distributed as quickly to the edge. The web platform 206 accordingly aggregates priority information from both parties and weighs the priorities including bandwidth, storage, memory available, etcetera. Thereafter, the web platform 206 optimizes against criteria using the multi-attribute model to decide how to best use the available resources. The preference data or priorities of both parties may include for example content lifespan, content aggregate weight, hardware prioritization, content prioritization, storage requirement, bandwidth requirement, specific content consumption in any neighborhood, speed of content delivery, cyber security, deep analysis. The above-mentioned factors may be used by the multi attribute model to run prioritization algorithm.

The web platform 206 may have a programmable interface and serves as an open platform for both parties viz. the service providers 202 and the content providers 204, to reduce the overall network cost and increase the end-user experience. Both service providers 202 and the content providers 204 may program the web platform 206 using their respective decision criteria. The web platform 206 also serves as a mediator between the service providers 202 and the content providers 204 and enables the service providers 202 and the content providers 204 to cooperate on their terms without sharing data. The service providers 202 and the content providers 204 use the web platform 206 to handle incoming service requests in real-time and also dynamically resolve any issues in the network thereby enhancing the overall experience of the end-users or customers. The web platform 206 thus provides a multi-sided web portal for both service providers 202 and content providers 204 and allow better resource distribution and bandwidth management along with personalized content delivery at the edge.

The plurality of first and second preference data are received by the multi-attribute model in response to one or more queries displayed to the at least one content provider and the at least one service provider 202 wherein the one or more queries based on the plurality of multiple attributes. Further, the received plurality of first and second preference data are aggregated into a multi-attribute model to generate at least one score corresponding to each of the plurality of first and second preference data. The multi-attribute model is configured based on a plurality of predefined attributes. The plurality of first and second preference data are received in response to one or more queries displayed to the at least one content provider and the at least one service provider 202, wherein the one or more queries based on the plurality of multiple attributes. The web platform 206 may specify role-based attributes to the at least one content provider 204 and the at least one service provider. For example, the web platform 206 may be configured to classify one or more platform roles for the service providers 202 and the content providers 204. The platform roles may include for example, 'Administrator', 'Management', 'Engineering', and 'Analytics Only'. The web platform 206 allows for specific, role-based inputs such as inputs from Chief Information Officer (CIO), Information Technology (IT) managers, Network Engineers from both parties. The web platform 206 may allow the service providers 202 and the content providers 204 to predefine one or more decision making criteria.

The web platform 206 may be further configured to analyze the DPI information along with other network data to identify whether an issue is to be resolved at the at least one service provider's end or at the at least one content provider's end. The web platform 206 raises a flag by sending a notification or errors alert to either of the identified at least one service provider end or the identified at least one content provider. Once it is identified that which issue is arising from which party, the correction attribute data may be sent to the concerned party to resolve the issue. The web platform 206 thus may send the correct attribute data to the identified at least one service provider 202 end or the identified at least one content provider 204 to resolve the identified issue in the broadband network 100.

Further, the web platform 206 may be configured to analyze the DPI information along with other network data and the at least one score to identify the one or more caching decisions. The caching decision may include decisions pertaining to store a content or associated links personalized for the end-user, wherein the one or more caching decisions is analyzed along with the DPI information by the multi-attribute model to make a final decision of storing a required content for a required duration at a required neighborhood level 110, thereby dynamically making available the personalized content at edge of the network for the end-user.

One or more databases may be associated with the web platform 206 may be configured for storing various data related to the dynamic customization of the decisions in the broadband network 100. As explained above, the plurality of smart nodes 102 are capable of performing the deep packet inspection. This allows the plurality of smart nodes 102 to analyse usage patterns of a particular neighborhood 110. The deep packet information data and the usage pattern data may be stored in the one or more databases. Through the analysis of usage patterns via the deep packet inspection at a neighborhood level 110, it becomes possible for the network to identify the requirements and take response actions. The smart nodes 102 installed at the hub-homes 108 facilitate the service providers 202 to make real time updates, change the traffic route, provide customized content to the end-users based on popularity of a content within a particular neighborhood 110 etcetera.

The decentralized architecture of the broadband network 100 allows for multiple redundancy within network as compared to the conventional architecture having single point of failure. The presence of smart nodes 102 and deep packet inspection at each level helps the service providers 202 and the content providers 204 to make good decisions and optimized content delivery to the end-users. The plurality of smart nodes 102 at the neighborhood level 110 works as 'Edge Nodes' in the broadband network 100 and allow the service providers 202 and the content providers 204 to respond and push updates at a neighborhood level 110 in real time. The web platform 206 facilitates in providing dynamic and automated decisions to balance the priorities or preferences such as network utilization and quality of experience. The AI module present in the smart nodes 102 ensures that the data is processed at a high speed, for example, at 10 Gbps, and also keep making new optimization decisions across the network based on dynamic requirements. Further, if any node in the system is down or in maintenance, the web platform 206 dynamically transmits functions and responsibilities to the nearest node. Thus, the decentralized nodes and orchestration software limit impact when nodes have downtime and allow for security isolation.

An application may be configured having a user interface (UX/UI) to provide a better experience to the end-users. The interface may also have a separate button with icon indicating to the end-users that the content is 'available at the edge'. The end-users may also have an "available at the edge" capability that shows them a new function on top of existing content applications like 'Netflix', 'Hulu', etcetera. The virtualization at the edge allows for delivery of adapted services. The content available at the edge may include videos, VR content, games, etcetera. The UX/UI may also be supported with highly responsive and security driven applications like Dropbox or VPN. An in-built store in the application or an 'App Store' may also be configured within the application. Further, the user may be facilitated to differentiate and select content and use software applications optimized to their consumption preferences.

The smart node may also contain a smart module, such as the module 404, having an intelligent content and service engine. The smart module may be a software application that is configured by using technologies like deep machine learning technology and blockchain technology. The smart module dynamically identifies user preferences, content popularity and accordingly facilitates in pushing the content closer to the end-user. With micro deployment of the smart nodes 102 at every hub-homes 108, the contents can be made available on the edge of the network. In one embodiment of the present disclosure, the smart module also provides the capability of identifying and calculating number of views, likes, reviews, ratings and comments for a particular show, video, movie, or any other content. The machine learning and deep learning techniques may be applied to predict content popularity and accordingly the content may be made available near to the end-user in a particular neighborhood 110. The intelligent content and service engine of the smart module, thus provides customization based on usage pattern to identify and deliver relevant content for the edge network. Accordingly, based on different data packets and neighborhoods 110, each smart node 102 is capable of identifying or detecting the different and dynamic data usage pattern that is relevant to respective end-users. Therefore, different data usage patterns may be identified dynamically by the smart node 102. The intelligent content and service engine of the smart module 404, may also be configured to analyse historical data to detect the data patterns.

The storage unit may be configured to provide a dynamic storage management for the content delivery and edge network distribution. According to the embodiments of the present disclosure, the storage unit via the smart node 102 is available to the end-users' premises at a neighborhood 110 level. The storage unit, being closer to the end-user, i.e., at the neighborhood 110 level, facilitates the content service providers 202 to display personalised content to their users, at a much faster speed as compared to the traditional centralized ISP network architecture. The storage unit is configured as a highly secure and encrypted data storage along with other components of the smart node 102.

The storage unit 406 is configured as edge cache, which may be specific to the end-users' requirements. The storage unit 406 may have limited storage capacity and therefore may only save the content that are relevant to the edge users. As the preferences and data usage patterns within a neighborhood 210 level or a community 302 level keep changing, the smart node 102 may accordingly make appropriate caching decisions to store the content or associated links for the end-users.

The AI Compute unit 408 may use a customized, learning neural network, for distributing content closer to the end-user thereby providing a high-speed content delivery and low latency. The AI compute unit 408 comprises GPUs (Graphics Processing Units) and TPUs (Tensor Processing Units) and is capable of performing continuous analysis on data traffic to identify the data usage pattern dynamically for corresponding neighborhood 110. Based on the analysis, provides improvement in the content delivery management and accordingly creates a chain reaction for improved user experience and efficiency across the network. Each AI-enabled edge compute device enables the pattern recognition necessary to deliver relevant content to the edge.

FIG. 3 illustrates various modules of the web platform 206 configured to provide customization of decisions pertaining to content delivery management in the broadband network 100.

The web platform 206 provides a private cloud hosted website 301. The private cloud hosted website 301 includes a web interface 301a, a web backend 301b and one or more databases 301c. The web interface 301a provides a dynamic web user interface to the service providers 202 and content providers 204. The dynamic web user interface allows users at the content provider's end and service provider's end (having administrator, management, engineering or analyst privilege), to customize or manage parameters for the decision-making criteria of the web platform 206. The dynamic web user interface further provides user interface to the end-users and enables access of the edge stored contents to the end users.

The web backend 301b interacts with at least one content provider API 302 and one or more service provider API 305. The content provider API 302 and the service provider API 305 are based on Simple Object Access Protocol (SOAP) enabling exchange of information with web platform 206 in decentralized, distributed application environment. The web backend 301a receives the first preference data from the at least one service provider 202 and the plurality of second preference data from the at least one content provider 204 in the broadband network 100.

The one or more databases 301c of the private cloud hosted website 301 is configured to store various data including, but not limited to, user preference data, data related to dynamic customization of the decisions in the broadband network 100 and configuration data for database roles. The web backend 301b hosts a suite of scripts for internal utilization, and enables functional interaction between the web interface 301a, one or more databases 301c and acts as a middleware application for data exchange between the web platform 206, the smart nodes 102, the service provider 202 and the content provider 204.

The web platform 206 includes a content provider script agent 303, hosted at point of presence (PoP) for the content provider 204 for execution of local scripts. The web platform 206 further includes a service provider script agent 306, hosted at PoP for the content provider 204 for execution of local scripts. A content provider network access 304 and a service provider network access 307 provides network interface with the web platform 206 to the content provider(s) and service provider(s), respectively.

The FIG. 3 further illustrates, a service provider hosted smart nodes deployment 308. The service provider hosted smart nodes deployment 308 includes dynamic multi-attribute content model 308a, an artificial intelligence (AI) neural network 308b, and deep packet inspection modules 308c.

The dynamic multi-attribute content model 308a receives plurality of first and second preference data and generates at least one score corresponding to each of the plurality of first and second preference data. Further, the dynamic multi-attribute content model 308a analyzes the DPI information and the at least one score for facilitating dynamic customization of the decisions and thereby delivering personalized content to an end-user. The dynamic multi-attribute content model 308a includes reference DMA variable list.

The smart nodes 102 further include the artificial intelligence neural network 308b which provides customization of the plurality of smart nodes 102 based on usage pattern of corresponding at least one neighborhood 110.

The deep packet inspection module 308c monitors service provider connection and performs deep analysis of network traffic, known as deep packet inspection (DPI).

Figure 4:
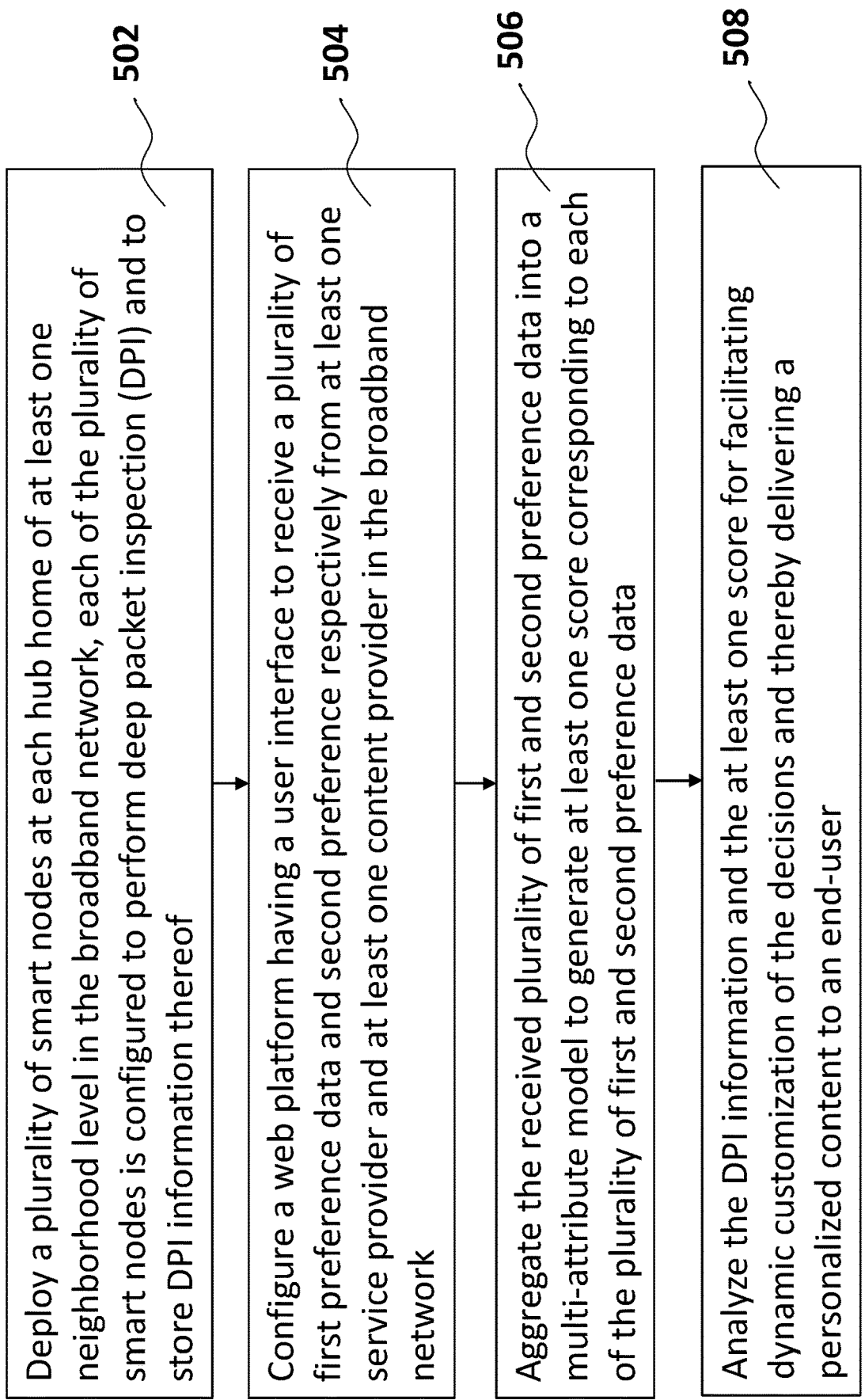
FIG. 4 illustrates a method for facilitating customization of decisions pertaining to content delivery management in the broadband network, according to an exemplary embodiment of the present invention.

FIG. 4 illustrates a method for facilitating customization of decisions pertaining to content delivery management in the broadband network 100, according to an exemplary embodiment of the present invention.

At step 502, a plurality of smart nodes 102 is deployed at each hub home 108 of at least one neighborhood level 110 in the broadband network 100. The broadband network 100 is a decentralized wireless broadband network 100 providing multiple redundancy within the network via the plurality of smart nodes 102. Each of the plurality of smart nodes 102 comprises one or more components including the artificial intelligence (AI) capable compute unit 402 and the smart module 404 for performing the deep packet inspection and one or more caching decisions, and the storage unit 406 for storing the DPI information and one or more content provided by the at least one content provider 102. Each of the plurality of smart nodes 102 is configured to perform deep packet inspection (DPI) and to store DPI information thereof. The DPI information include information pertaining to network traffic flow, data usage pattern of corresponding at least one neighborhood level 110, available network resources, storage capacity of a corresponding smart node, bandwidth, virus traffic level at an instant, end-user preferences. The DPI information is analyzed along with other network data to identify whether an issue is to be resolved at the at least one service provider's end or at the at least one content provider's end. A flag or an error alert is raised to the identified at least one service provider end or the identified at least one content provider. Subsequently, correct attribute data is sent to the identified at least one service provider end or the identified at least one content provider to resolve the identified issue in the broadband network 100.

At step 504 a web platform 206 may be configured. The web platform 206 has a user interface that may be programmable by at least one service providers 202 and at least one content providers 204. The web platform 206 receives a plurality of first preference data from at least one service provider 202 in the broadband network 100. A plurality of second preference data is also received from at least one content provider in the broadband network 100.

At step 506, the received plurality of first and second preference data may be aggregated into a multi-attribute model to generate at least one score corresponding to each of the plurality of first and second preference data. The multi-attribute model is configured based on a plurality of predefined attributes. The plurality of first and second preference data are received in response to one or more queries displayed to the at least one content provider and the at least one service provider 202, the one or more queries based on the plurality of multiple attributes.

At step 508, the DPI information may be analyzed and the at least one score for facilitating dynamic customization of the decisions is generated. Subsequently, a personalized content is delivered to an end-user. The one or more caching decisions is analyzed along with the DPI information by the multi-attribute model to make a final decision of storing a required content for a required duration at a required neighborhood level 110, thereby dynamically making available the personalized content at edge of the network for the end-user.

The system and method as described herein describe a platform and it should be noted that this platform may be useable with delivery management as described in U.S. application Ser. No. 17,380,230 filed on Jul. 20, 2021, the contents of which application are herein incorporated by reference as if fully set forth.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What is claimed is:

1. A method for facilitating customization of decisions pertaining to content delivery management in a broadband network, the method comprising:
deploying a plurality of smart nodes at each hub home of at least one neighborhood level in the broadband network, and on at least one tower, and at least one data center, wherein the plurality of smart nodes is deployed as a micro point of presence in the at least one tower and the at least one data center, and wherein the micro point of presence serves as an access point at a location to connect at least one service provider and at least one content provider;

performing, via each of the plurality of smart nodes in the broadband network, deep packet inspection (DPI) allowing the plurality of smart nodes to analyse usage patterns of a particular neighborhood and to store DPI information thereof, wherein the plurality of smart nodes is configured to identify user preferences and content popularity to perform DPI; and configuring a web platform having a user interface for:

receiving a plurality of first preference data from the at least one service provider in the broadband network, the first preference data comprising priorities of the at least one service provider including one or more of network efficiency, hardware prioritization, storage requirement, and receiving a plurality of second preference data from the at least one content provider in the broadband network, the second preference data comprising priorities of the at least one content provider including one or more of content lifespan, content aggregate weight, content prioritization, bandwidth requirement, specific content consumption in any neighborhood, speed of content delivery, cyber security, and deep analysis, aggregating the received plurality of first and second preference data into a multi-attribute model to generate at least one score corresponding to each of the plurality of first and second preference data, and analyzing the DPI information and the at least one score to identify one or more caching decision for facilitating dynamic customization of the decisions and thereby delivering a personalized content to an end-user;

wherein the DPI information include information pertaining to network traffic flow, data usage pattern of corresponding at least one neighborhood level, available network resources, storage capacity of a corresponding smart node, bandwidth, virus traffic level at an instant, end-user preferences.

2. The method of claim 1, wherein the multi-attribute model is configured based on a plurality of predefined attributes.

3. The method of claim 2, wherein the plurality of first and second preference data are received in response to one or more queries displayed to the at least one content provider and the at least one service provider, the one or more queries based on the plurality of multiple attributes.

4. The method of claim 1, further comprising:

analyzing the DPI information along with other network data to identify whether an issue is to be resolved at the at least one service provider's end or at the at least one content provider's end;

raising an error alert to the identified at least one service provider end or the identified at least one content provider; and sending correct attribute data to the identified at least one service provider end or the identified at least one content provider to resolve the identified issue in the broadband network.

5. The method of claim 1, wherein each of the plurality of smart nodes comprises one or more components including:

an artificial intelligence (AI) capable compute unit and a smart module for performing the deep packet inspection and one or more caching decisions; and a storage unit for storing the DPI information and one or more content provided by the at least one content provider.

6. The method of claim 5, the one or more caching decisions include decisions pertaining to store a content or associated links personalized for the end-user.

7. The method of claim 5, wherein the one or more caching decisions is analyzed along with the DPI information by the multi-attribute model to make a final decision of storing a required content for a required duration at a required neighborhood level, thereby dynamically making available the personalized content at edge of the network for the end-user.

8. The method of claim 1, wherein the broadband network is a decentralized wireless broadband network providing multiple redundancy within the network via the plurality of smart nodes.

9. The method of claim 1, further comprising configuring one or more databases associated with the web platform for storing various data related to the dynamic customization of the decisions in the broadband network.

10. A system for facilitating customization of decisions pertaining to content delivery management in a broadband network, the system comprising:

a plurality of smart nodes deployed at each hub home of at least one neighborhood level in the broadband network, and on at least one tower, and at least one data center, wherein the plurality of smart nodes is deployed as a micro point of presence in the at least one tower and the at least one tower and the at least one data center, and wherein the micro point of presence serves as an access point at a location to connect at least one service provider and at least one content provider:

performing, via each of the plurality of smart nodes in the broadband network. deep packet inspection (DPI) allowing the plurality of smart nodes to analyze usage patterns of a particular neighborhood and to store DPI information thereof, wherein the plurality of smart nodes is configured to identify user preference and content popularity to perform DPI information; and a processing module having a web platform including a user interface screen configured to:

receive a plurality of first preference data from the at least one service provider in the broadband network, the first preference data comprising priorities of the at least one service provider including one or more of network efficiency, hardware prioritization, storage requirement, receive a plurality of second preference data from the at least one content provider in the broadband network, the second preference data comprising priorities of the at least one content provider including one or more of content lifespan, content aggregate weight, content prioritization, bandwidth requirement, specific content consumption in any neighborhood, speed of content delivery, cyber security, and deep analysis, aggregate the received plurality of first and second preference data into a multi-attribute model to generate at least one score corresponding to each of the plurality of first and second preference data, and analyze the DPI information and the at least one score to identify one or more caching decision for facilitating dynamic customization of the decisions to deliver a personalized content to an end-user;

wherein, the DPI information include information pertaining to network traffic flow, data usage pattern of corresponding at least one neighborhood level, available network resources, storage capacity of a corresponding smart node, bandwidth, virus traffic level at an instant, end-user preferences; and wherein each of the plurality of smart nodes comprises one or more components including:
an artificial intelligence (AI) capable compute unit and a smart module for performing the deep packet inspection and one or more caching decisions, wherein the AI compute unit comprises at least one GPU (Graphics Processing Unit) and TPU (Tensor Processing Unit); and
a storage unit for storing the DPI information and one or more content provided by the at least one content provider.

11. The system of claim 10, wherein the multi-attribute model is configured based on a plurality of predefined attributes.

12. The system of claim 11, wherein the plurality of first and second preference data are received in response to one or more queries displayed to the at least one content provider and the at least one service provider, the one or more queries based on the plurality of multiple attributes.

13. The system of claim 10, wherein the web platform is further configured to: analyze the DPI information along with other network data to identify whether an issue is to be resolved at the at least one service provider's end or at the at least one content provider's end;
raise an error alert to the identified at least one service provider end or the at least one content provider; and
send correct attribute data to the identified at least one service provider end or the at least one content provider to resolve the identified issue in the broadband network.

14. The system of claim 10, wherein the one or more caching decisions include decisions pertaining to store a content or associated links personalized for the end-user.

15. The system of claim 10, wherein the one or more caching decisions is analyzed along with the DPI information by the multi-attribute model to make a final decision of storing a required content for a required duration at a required neighborhood level, thereby dynamically making available the personalized content at edge of the network for the end-user.

16. The system of claim 10, wherein the broadband network is a decentralized wireless broadband network providing multiple redundancy within the network via the plurality of smart nodes.

17. The system of claim 10, further comprising one or more databases associated with the web platform configured for storing various data related to the dynamic customization of the decisions in the broadband network.

18. A method for facilitating customization of decisions pertaining to content delivery management in a broadband network, the method comprising:
deploying a plurality of smart nodes at each hub home of at least one neighborhood level in the broadband network, each of the plurality of smart nodes in the broadband network is configured to perform deep packet inspection (DPI) allowing the plurality of smart nodes to analyze usage patterns of a particular neighborhood and to store DPI information thereof, and
configuring a web platform having a user interface for:
receiving a plurality of first preference data from at least one service provider in the broadband network,
receiving a plurality of second preference data from at least one content provider in the broadband network,
aggregating the received plurality of first and second preference data into a multi-attribute model to generate at least one score corresponding to each of the plurality of first and second preference data,
analyzing the DPI information and the at least one score for facilitating dynamic customization of the decisions to deliver personalized content to an end-user,
analyzing the DPI information along with other network data to identify whether an issue is to be resolved at the at least one service provider's end or at the at least one content provider's end;
raising an error alert to the identified at least one service provider end or the identified at least one content provider; and
sending correct attribute data to the identified at least one service provider end or the identified at least one content provider to resolve the identified issue in the broadband network;
wherein, the DPI information include information pertaining to network traffic flow, data usage pattern of corresponding at least one neighborhood level, available network resources, storage capacity of a corresponding smart node, bandwidth, virus traffic level at an instant, end-user preferences.

* * * * *